(12) United States Patent
Washihira

(10) Patent No.: US 10,399,517 B2
(45) Date of Patent: Sep. 3, 2019

(54) VEHICLE-MOUNTED COMPONENT

(71) Applicant: SUMITOMO WIRING SYSTEMS, LTD., Mie (JP)

(72) Inventor: Kenichi Washihira, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/323,987

(22) PCT Filed: Aug. 7, 2017

(86) PCT No.: PCT/JP2017/028569
§ 371 (c)(1),
(2) Date: Feb. 7, 2019

(87) PCT Pub. No.: WO2018/030335
PCT Pub. Date: Feb. 15, 2018

(65) Prior Publication Data
US 2019/0168697 A1 Jun. 6, 2019

(30) Foreign Application Priority Data

Aug. 10, 2016 (JP) .................................. 2016-157939

(51) Int. Cl.
*H02G 3/08* (2006.01)
*B60R 13/08* (2006.01)
(Continued)

(52) U.S. Cl.
CPC ...... *B60R 16/0238* (2013.01); *B60R 13/0815* (2013.01); *H01R 13/74* (2013.01); *H02G 3/081* (2013.01)

(58) Field of Classification Search
CPC ............ B60R 16/0238; B60R 16/0239; B60R 13/0815; H02G 3/081; H01R 13/074
See application file for complete search history.

(56) References Cited

U.S. PATENT DOCUMENTS 5,967,808 A * 10/1999 Kubota ............ H01R 13/62911
439/157
2002/0061666 A1* 5/2002 Sato ..................... H01R 9/226
439/76.2
(Continued)

FOREIGN PATENT DOCUMENTS

JP 07-042535 8/1995
JP 09-093756 4/1997
(Continued)

OTHER PUBLICATIONS

Official Communication issued in International Bureau of WIPO Patent Application No. PCT/JP2017/028569, dated Aug. 29, 2017.

*Primary Examiner* — Timothy J Thompson
*Assistant Examiner* — Rhadames Alonzo Miller
(74) *Attorney, Agent, or Firm* — Greenblum & Bernstein, P.L.C.

(57) ABSTRACT

A vehicle-mounted component can be fixed to a vehicle body panel in a space efficient manner using a through hole of the vehicle body panel and the box main body and the cover member are easily attached to each other. In a vehicle-mounted component a cover member is attached to a box main body, a first side surface of a peripheral wall of the box main body is a covering lid wall portion that protrudes more in the height direction of the peripheral wall than other side surfaces, and the covering lid wall portion is fixed to a vehicle body panel via a hook recessed portion and a lock fitting portion by the hook recessed portion and the lock fitting portion provided in the covering lid wall portion being inserted into a through hole of the vehicle body panel and being fitted into peripheral edge portions facing each other.

4 Claims, 18 Drawing Sheets

(51) Int. Cl.
*H01R 13/74* (2006.01)
*B60R 16/023* (2006.01)

(56) References Cited

U.S. PATENT DOCUMENTS

| | | | |
|---|---|---|---|
| 2009/0117758 A1* | 5/2009 | Yamaguchi | H05K 7/026 |
| | | | 439/76.2 |
| 2009/0247015 A1* | 10/2009 | Taniguchi | H01H 85/0208 |
| | | | 439/620.33 |
| 2011/0094767 A1* | 4/2011 | Asao | H01R 9/2491 |
| | | | 174/50 |
| 2011/0094793 A1* | 4/2011 | Asao | B60R 16/0238 |
| | | | 174/549 |
| 2011/0201216 A1* | 8/2011 | Miyamoto | B60R 25/00 |
| | | | 439/76.2 |
| 2012/0085766 A1* | 4/2012 | I | B60R 16/0239 |
| | | | 220/378 |
| 2012/0327618 A1* | 12/2012 | Hara | B60R 16/0238 |
| | | | 361/752 |
| 2013/0017012 A1* | 1/2013 | Kawamura | H02G 3/16 |
| | | | 403/291 |
| 2013/0250489 A1* | 9/2013 | Toda | B60R 16/0238 |
| | | | 361/648 |
| 2013/0327566 A1* | 12/2013 | Makino | H02G 3/088 |
| | | | 174/520 |
| 2015/0101862 A1* | 4/2015 | Shiraki | H02G 3/088 |
| | | | 174/563 |
| 2016/0006228 A1* | 1/2016 | Kawamura | H02G 3/086 |
| | | | 361/657 |
| 2017/0063069 A1* | 3/2017 | Kawada | H01B 7/0045 |
| 2018/0100535 A1* | 4/2018 | Tashiro | F16B 39/24 |

FOREIGN PATENT DOCUMENTS

| | | |
|---|---|---|
| JP | 11-289636 | 10/1999 |
| JP | 2010-108849 | 5/2010 |
| JP | 2011-010493 | 1/2011 |

* cited by examiner

VEHICLE-MOUNTED COMPONENT

TECHNICAL FIELD

The present invention relates to a vehicle-mounted component such as an electrical junction box and a connector holder of vehicles that includes a box main body and a cover member.

BACKGROUND ART

Conventionally, in an electrical system of an automobile, many vehicle-mounted components, such as electrical junction boxes including a junction box and a fuse box and a connector holder in which a connector provided in a terminal end of a wire harness is held, have been employed. For example, as disclosed in JP 2011-10493A (Patent Document 1), these vehicle-mounted components are provided with a box main body for accommodating and holding an internal circuit body, a connector, and the like and a cover member for covering an opening portion of the box main body.

Incidentally, for example, as disclosed in JP 2010-108849A (Patent Document 2), there are cases where such a vehicle-mounted component is attached to a vehicle body panel by inserting the vehicle-mounted component through a through hole provided in the vehicle body panel and fixing the fixing portions protruding on the peripheral wall portion of the box main body with bolts to the peripheral edge portion of the through hole of the vehicle body panel.

However, due to the recent demands for miniaturization and densification of vehicles, the installation space of the vehicle-mounted components is also limited, and it is sometimes difficult to pass the vehicle-mounted component through the through hole of the vehicle body and arrange it on the outer side of the vehicle body panel. Furthermore, the protrusion allowance of the vehicle-mounted component to the inside of the vehicle body panel is often restricted, and there are also cases where it is not possible to adopt a structure for stably attaching the vehicle-mounted component to the vehicle body panel via a separate bracket. Accordingly, to realize stable attachment to the vehicle body panel within a limited space, the structure of the box main body becomes complicated and there is a concern that attaching the box main body and the cover member to each other will be difficult.

CITATION LIST

Patent Documents

Patent Document 1: JP 2011-10493A
Patent Document 2: JP 2010-108849A

SUMMARY OF INVENTION

Technical Problem

The present invention has been made in view of the above-mentioned circumstances, and it is an object of the present invention to solve the problem and provide a vehicle-mounted component with a novel structure in which the vehicle-mounted component can be fixed to a vehicle body panel in a space efficient manner using a through hole provided in the vehicle body panel and the box main body and the cover member can be easily attached to each other.

Solution to Problem

Hereinafter, aspects of the present invention made to solve such issues will be described. It should be noted that constituent elements that are employed in the aspects described below can be employed in any combination whenever possible.

That is, in the first aspect of the present invention, in a vehicle-mounted component that includes a box main body and a cover member covering an opening portion of the box main body and is to be fixed to a through hole provided in a vehicle body panel, a first side surface in a peripheral wall of the box main body is arranged opposite to the through hole, the first side surface is constituted by a covering lid wall portion that protrudes more in the height direction of the peripheral wall than the other side surfaces of the peripheral wall of the box main body and spreading in a size capable of covering the through hole, a hook recessed portion that is inserted into a first peripheral edge portion of the through hole and a lock fitting portion that is fitted into and locked to a second peripheral edge portion opposite to the first peripheral edge portion of the through hole via an elastic deflection piece are provided on a surface of the covering lid wall portion on the through hole side, the covering lid wall portion is fixed to the vehicle body panel via the hook recessed portion and the lock fitting portion of the covering lid wall portion, a guide portion into which a fitting portion provided on an outer surface of the cover member is fitted is provided on a surface of the covering lid wall portion on the box main body side so as to be located on a protruding end portion side with respect to the box main body, and a lock portion provided in an opening end portion of the cover member is to be positioned with respect to a locked portion provided on the other side surface of the peripheral wall of the box main body by fitting the fitting portion of the cover member into the guide portion of the covering lid wall portion.

According to this aspect, in the peripheral wall of the box main body, the first side surface that is arranged to face the through hole of the vehicle body panel is constituted by the covering lid wall portion that protrudes more in the height direction than the other side surfaces of the peripheral wall of the box main body and spreads in a size capable of covering the through hole. By providing, using this covering lid wall portion, a hook recessed portion that is inserted into the first peripheral edge portion of the through hole and the lock fitting portion that is fitted to and locked to the second peripheral edge portion opposite to the first peripheral edge portion of the through hole via the elastic deflection piece, the covering lid wall portion can be fixed to the through hole via the hook recessed portion and the lock fitting portion. Accordingly, the vehicle-mounted component can be stably fixed to the vehicle body panel by the hook recessed portion and the lock fitting portion that are provided on the covering lid wall portion being engaged to the through hole.

In addition, because only the hook recessed portion and the lock fitting portion protrude to the outside of the through hole of the vehicle body panel, the vehicle-mounted component can be advantageously kept from protruding to the outside of the vehicle body panel. Furthermore, because the vehicle-mounted component arranged on the inner side of the vehicle body panel is fixed to the vehicle body panel by the hook recessed portion and the lock fitting portion that are fitted to the peripheral edge portions of the through hole without using a separate bracket or the like, compared to the case where a bracket is used, the protrusion allowance of the vehicle-mounted component to the inside of the vehicle body panel can be suppressed, and the vehicle-mounted component can be fixed to the vehicle body panel in a space efficient manner using the through hole provided in the vehicle body panel.

In addition, regarding the attachability between the lock portion provided in the opening end portion of the cover member and the locked portion provided in the other side surface of the peripheral wall of the box main body, which becomes difficult due to the covering lid wall portion largely protruding in the height direction of the box main body, the lock portion and the locked portion are to be positioned by inserting the fitting portion provided on the outer surface of the cover member into the guide portion provided on the protruding end portion side of the covering lid wall portion. Therefore, for the first time, it is possible to achieve both realization of the space-efficient fixing of the vehicle-mounted component and improvement of the attachability of the box main body and the cover member by using the covering lid wall portion.

Note that, by forming the covering lid wall portion in a size capable of covering the through hole of the vehicle body panel, it is also possible to realize stable fixing of the vehicle-mounted component to the vehicle body panel and to advantageously prevent intrusion of foreign matter, transmission of noise, and the like from the outside to the inside of the vehicle body panel through the through hole.

A second aspect of the present invention according to the first aspect, an additional lock portion is provided at an upper end portion of an outer surface of the cover member that is overlapped with the covering lid wall portion, and an additional locked portion into which the additional lock portion is fitted is provided at a protruding distal end portion of the covering lid wall portion.

According to the present aspect, because the covering lid wall portion and the peripheral wall of the cover member that is overlapped with the covering lid wall portion are fixed to each other by the additional lock portion and the additional locked portion, the attachment stability between the cover member and the box main body can be improved. Furthermore, because the position between the lock portion and the additional lock portion and the position between the locked portion and the additional locked portion are separated in the height direction of the box main body, the covering lid wall portion is reliably fixed to the cover member at different positions in the height direction, and the stable attachment can be advantageously realized.

A third aspect of the present invention according to the first or second aspect, an additional lock fitting portion that is fitted into and locked to a third peripheral edge portion extending orthogonally to the first peripheral edge portion and the second peripheral edge portion of the through hole via an elastic deflection piece is provided on the surface of the covering lid wall portion on the through hole side.

According to this aspect, because the additional lock fitting portion to be further fitted to and locked to the third peripheral wall portion extending orthogonally to the first peripheral wall portion and the second peripheral wall portion facing each other in the through hole is provided on the covering lid wall portion, it is possible to realize further stable fixing of the covering lid wall portion to the through hole, which realizes the even more stable fixing of the vehicle-mounted component to the vehicle body panel.

A fourth aspect of the present invention according to any one of the first to third aspects, a soundproof member is arranged between the covering lid wall portion and the vehicle body panel, and the covering lid wall portion has a soundproof member supporting function for supporting the soundproof member by pressing the soundproof member to the vehicle body panel side.

According to this aspect, because the soundproof member that is arranged between the covering lid wall portion and the peripheral edge portion of the through hole of the vehicle body panel is pressed to the vehicle body panel side and supported by the covering lid wall portion, the soundproof member can be easily attached by attaching the vehicle-mounted component that includes the covering lid wall portion to the vehicle body panel, and noise that is transmitted from the gap between the through hole and the covering lid wall portion into the vehicle interior can be effectively reduced.

Advantageous Effects of Invention

According to the present invention, the first side surface of the box main body provided opposite to the through hole of the vehicle body panel is constituted by the covering lid wall portion that protrudes more in the height direction than the other side surfaces of the peripheral wall of the box main body and spreads in a size capable of covering the through hole, and, by providing, using the covering lid wall portion, the hook recessed portion that is inserted into the first peripheral edge portion of the through hole and the lock fitting portion that is fitted into and locked to, via the elastic deflection piece, the second peripheral edge portion opposite to the first peripheral edge portion of the through hole, the covering lid wall portion can be fitted to the vehicle body panel via the hook recessed portion and the lock fitting portion. Accordingly, the vehicle-mounted component can be stably fixed to the vehicle body panel by the hook recessed portion and the lock fitting portion that are provided on the covering lid wall portion being engaged with the through hole. Also, the protrusion of the vehicle-mounted component to the outside and inside of the vehicle body panel is advantageously suppressed, and the vehicle-mounted component can be fixed to the vehicle body panel in a space-efficient manner. In addition, by inserting the fitting portion provided on the outer surface of the cover member into the guide portion provided on the protruding end portion side of the covering lid wall portion, the lock portion of the cover member and the locked portion of the box main body can be positioned. Accordingly, both space-efficient fixing of the vehicle-mounted component and improvement of the attachability of the box main body and the cover member can be achieved using the covering lid wall portion. Also, by forming the covering lid wall portion in a size capable of covering the through hole of the vehicle body panel, the intrusion of foreign matter, transmission of noise, and the like from the outside to the inside of the vehicle body panel through the through hole can be advantageously prevented.

DESCRIPTION OF EMBODIMENTS

Hereinafter, an embodiment of the present invention will be described with reference to the drawings.

Figure 20:
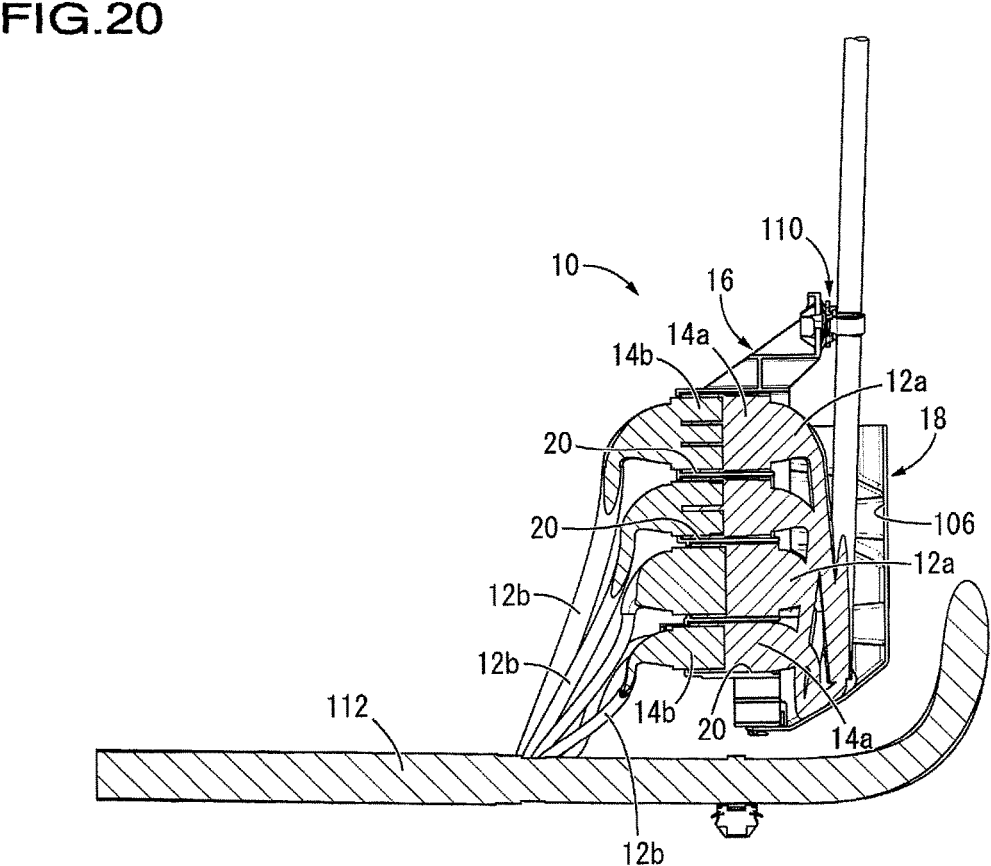
FIG. 20 is an XX-XX sectional view of FIG. 5.

FIGS. 1 to 6 show a state in which a connector holder 10 acting as a first embodiment of a vehicle-mounted component that has a structure according to the present invention holds first and second connectors 14a and 14b (see FIG. 20) attached to the ends of first and second wire harnesses 12a and 12b. The connector holder 10 has a structure in which a cover member 18 is attached to a holder main body 16 as a box main body. In the following description, in principle, the vertical direction means the vertical direction in FIG. 1 that is the vertical direction in a vehicle-mounted state, the front-back direction means the left-right direction in FIG. 1, and the left-right direction means the left-right direction in FIG. 5, respectively.

The holder main body 16 is an elongated member as shown in FIGS. 7 to 13, and is an integrally molded product made of a synthetic resin. The holder main body 16 is block-shaped as a whole. In the holder main body 16, multiple connector accommodation portions 20 (four in this embodiment) are formed side by side in the longitudinal direction (vertical direction), and another connector accommodation portion 20 is arranged on a side of the connector accommodation portion 20 located at the lower end in the longitudinal direction. Note that a grid-shaped reinforcing portion 22 is provided below the five connector accommodation portions 20 in the holder main body 16 in the longitudinal direction to improve the deformation rigidity of the holder main body 16. Also, a wire fastening portion 24 inclined forward as it extends upward is provided above the five connector accommodation portions 20 in the holder main body 16 in the longitudinal direction. The distal end portion of the wire fastening portion 24 is formed in a flat plane shape that is widened substantially orthogonally to the front-back direction, and a fastening member attaching hole 26 penetrating therethrough in the thickness direction is formed in the distal end portion of the wire fastening portion 24.

In addition, on the left side surface of the peripheral wall of the holder main body 16, two connector holding portions 28 are formed side by side in the longitudinal direction. Each connector holding portion 28 has a structure in which a pair of connector guide ribs 30 arranged aligned in the vertical direction project integrally from the peripheral wall of the holder main body 16 and linearly extend backward and forward, and a connector locked piece 32 is disposed between the pair of connector guide ribs 30. The base end portion of the connector locked piece 32 is integrally connected to the outer surface of the peripheral wall of the holder main body 16, and is provided in parallel to the peripheral wall of the holder main body 16 with a gap therebetween, and extends in the manner of a cantilever from the base end portion (front end portion) to the rear, which is a fitting direction.

Furthermore, multiple locked portions 34 are formed on the peripheral wall of the holder main body 16. Each locked portion 34 has a structure in which a first engaged portion 36 arranged substantially parallel to the peripheral wall of the holder main body 16 is provided extending in a direction substantially orthogonal to the front-back direction that is the fitting direction of the cover member 18 to be described later, and two end portions of each first engaged portion 36 are integrally connected to the holder main body 16 by first supporting portions 38. In this embodiment, two locked portions 34 are provided on the left side surface of the peripheral wall of the holder main body 16 so as to be vertically separated, and another locked portion 34 is provided on the lower surface.

Also, the right side that is the first side surface of the peripheral wall of the holder main body 16 is constituted by a covering lid wall portion 40 that largely protrudes more in the height direction than the other side surfaces of the peripheral wall of the holder main body 16. The covering lid wall portion 40 has a plate shape that largely protrudes to the front and rear sides with respect to the other side surfaces of the peripheral wall of the holder main body 16, and is integrally connected to the holder main body 16 at a front-rear intermediate portion.

Also, on the surface (right surface) of the covering lid wall portion 40 opposite to the connector accommodation portions 20, a hook recessed portion 42 is provided at the lower end edge portion so as to protrude therefrom. The hook recessed portion 42 protrudes to the right from the covering lid wall portion 40, and includes an engagement groove portion 44 that extends over the entire length thereof in the front-back direction while being open downward. This engagement groove portion 44 has a groove sectional shape corresponding to a vehicle body panel 114 to be described later. On the wall surface of the engagement groove portion 44 on the opposite side (right side) from the covering lid wall portion 40, a guide surface 46 inclined to the right in the downward direction is continuously provided.

Furthermore, in the upper end edge portion of the right surface of the covering lid wall portion 40, a lock fitting portion 48 is provided so as to protrude therefrom. The lock fitting portion 48 includes a first elastic deflection piece 50 and a first fixed supporting piece 52.

Figure 12:
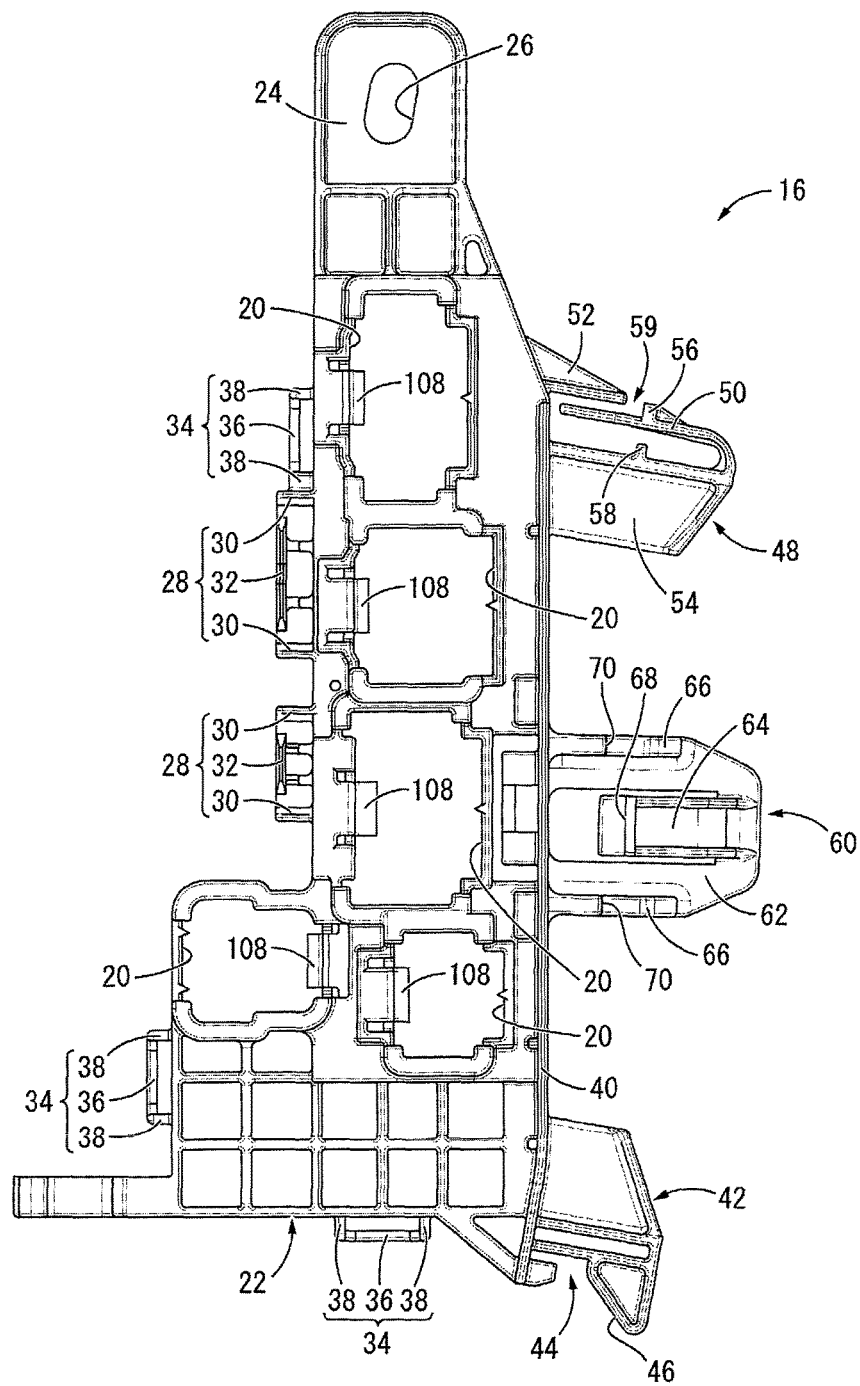
FIG. 12 is a right side view of the holder main body shown in FIG. 7.
Figure 13:
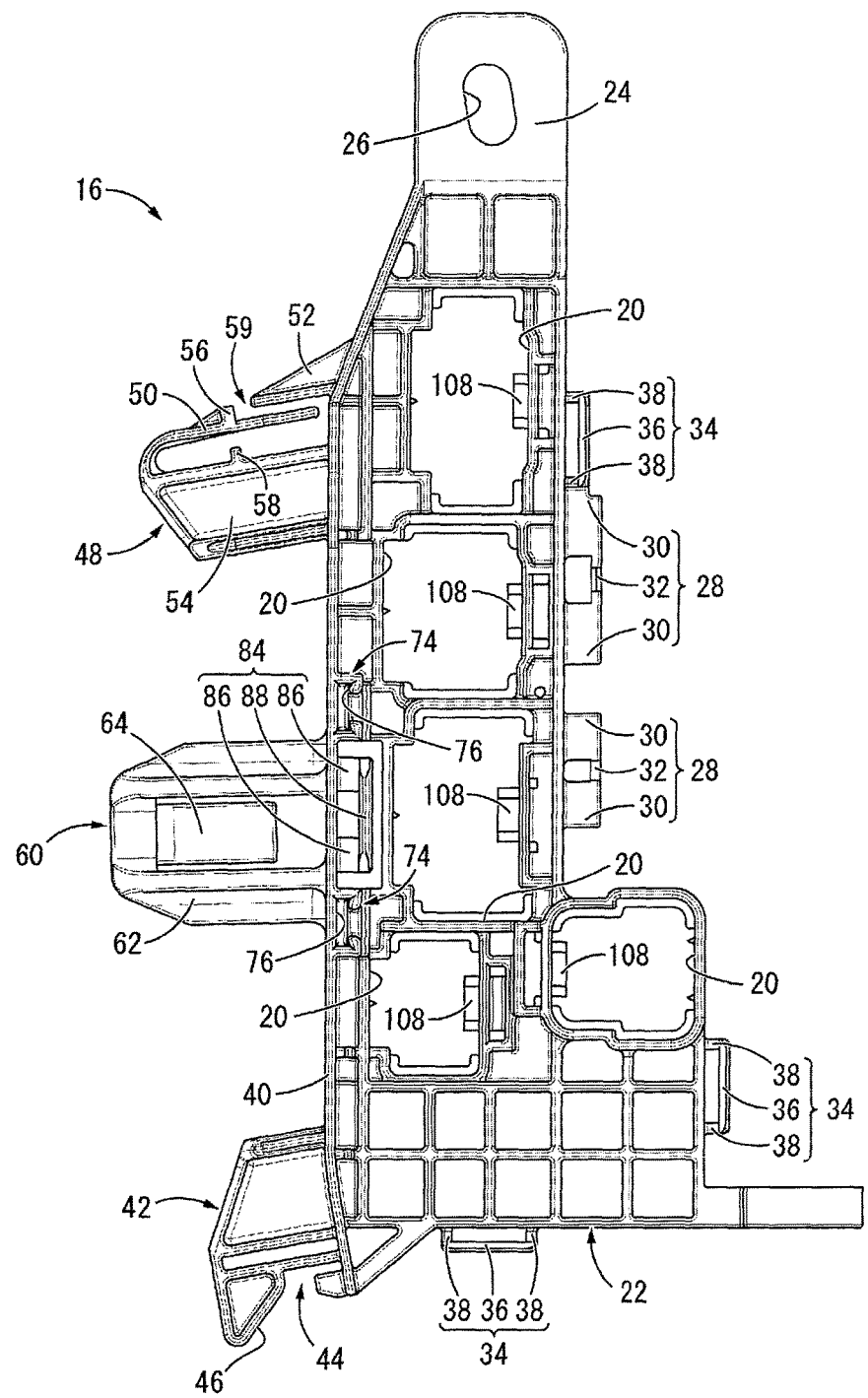
FIG. 13 is a left side view of the holder main body shown in FIG. 7.
Figure 14:
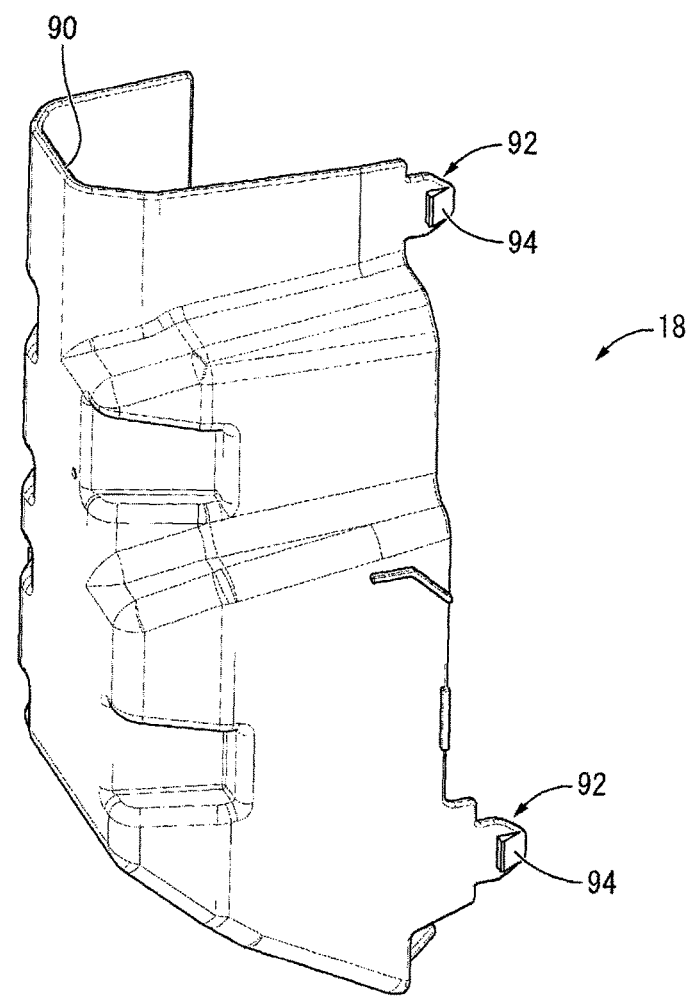
FIG. 14 is an enlarged perspective view of a cover member that constitutes the connector holder shown in FIG. 1.
Figure 15:
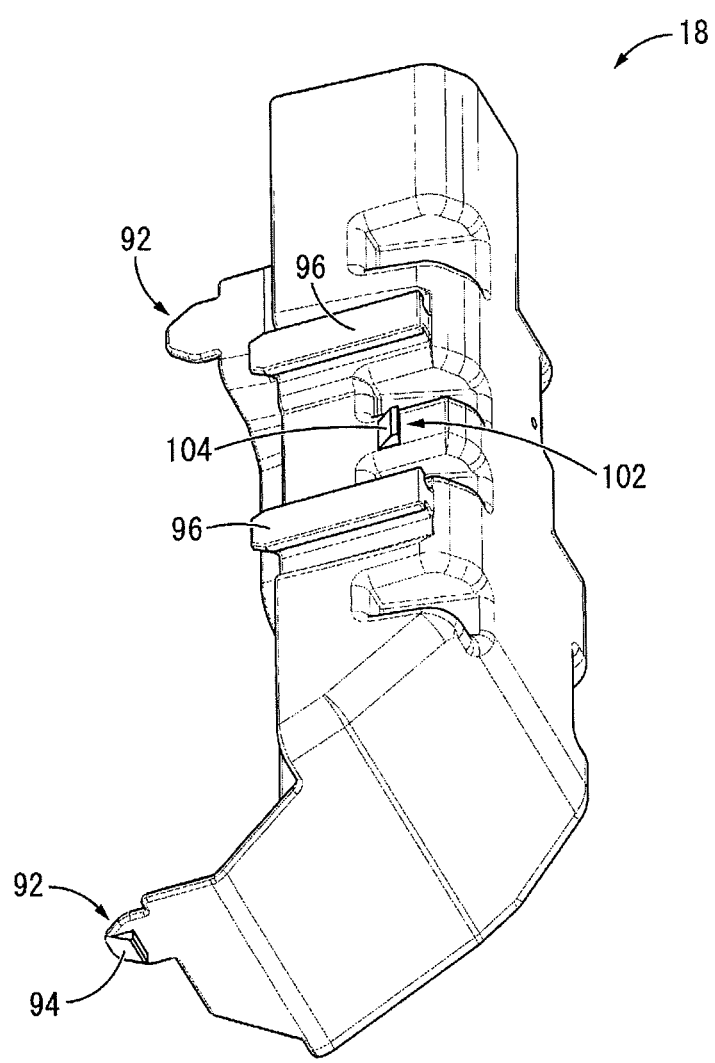
FIG. 15 is a perspective view of the cover member shown in FIG. 14 at another angle.
Figure 16:
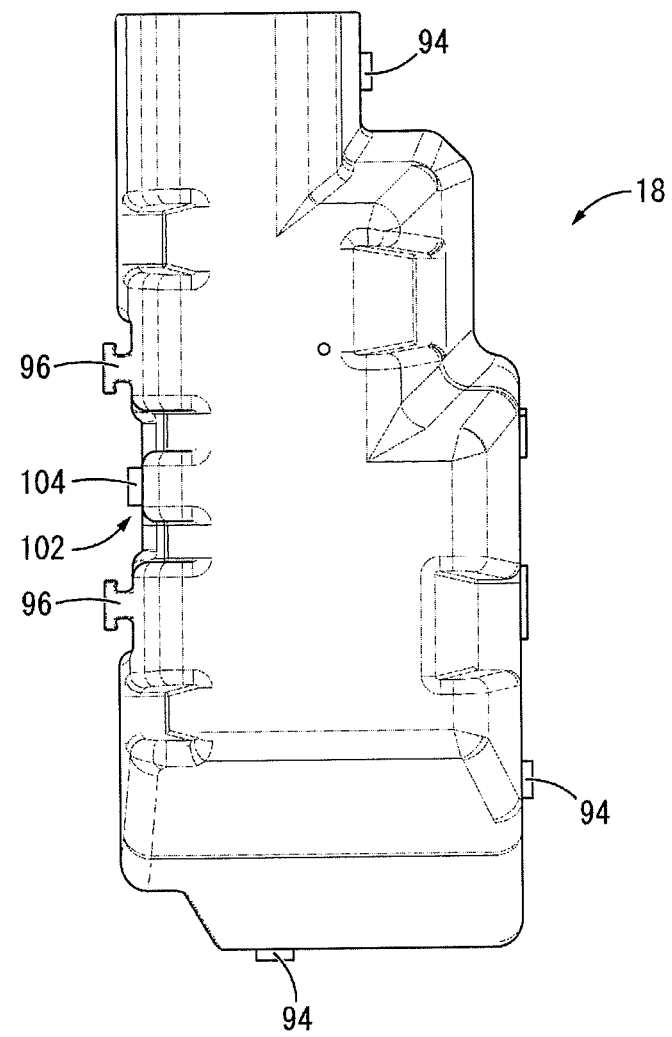
FIG. 16 is a left side view of the cover member shown in FIG. 14.
Figure 17:
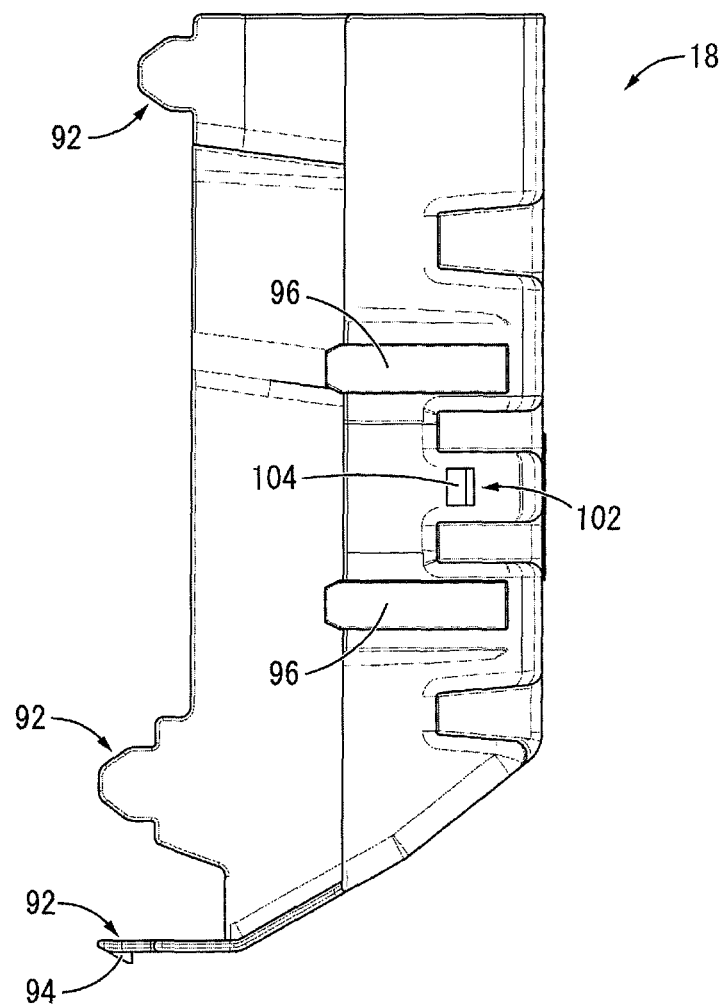
FIG. 17 is a rear view of the cover member shown in FIG. 14.

As shown in FIG. 12, the first elastic deflection piece 50 is formed into a thin plate shape, and elastic deflection deformation in the thickness direction is allowed. Furthermore, the first elastic deflection piece 50 protrudes in the manner of a cantilever to the front from the protruding distal end portion of a first connecting portion 54 that protrudes from the covering lid wall portion 40. Also, the base end portion of the first elastic deflection piece 50 is curved in an arc shape in the thickness direction, and extends in a direction (leftward) approaching the covering lid wall portion 40. In addition, a fitting protrusion 56 that protrudes upward is integrally formed at the intermediate portion in the extending direction of the first elastic deflection piece 50. Note that, on the surface of the first connecting portion 54 facing the first elastic deflection piece 50, an abutting protrusion 58 that protrudes toward the first elastic deflection piece 50 is formed, and the elastic deformation amount of the first elastic deflection piece 50 is restricted by contact with the abutting protrusion 58.

The first fixed supporting piece 52 protrudes to the right from the covering lid wall portion 40 above the first connecting portion 54, and is opposed to the fitting protrusion 56 of the first elastic deflection piece 50 with a predetermined gap therebetween. A groove-shaped first fitting region 59 substantially corresponding to the thickness of the vehicle body panel 114 to be described later is formed between the protruding distal end of the first fixed supporting piece 52 and the fitting protrusion 56 of the first elastic deflection piece 50.

Figure 1:
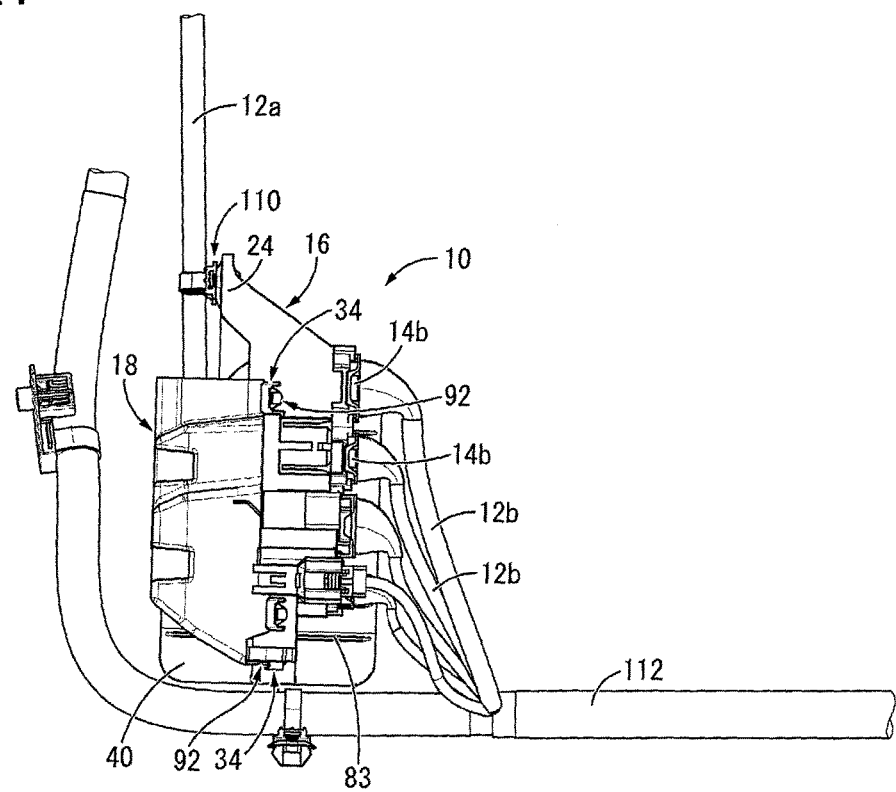
FIG. 1 is an elevation view of a connector holder according to a first embodiment of the present invention in a state where connectors and wire harnesses are attached thereto.
Figure 2:
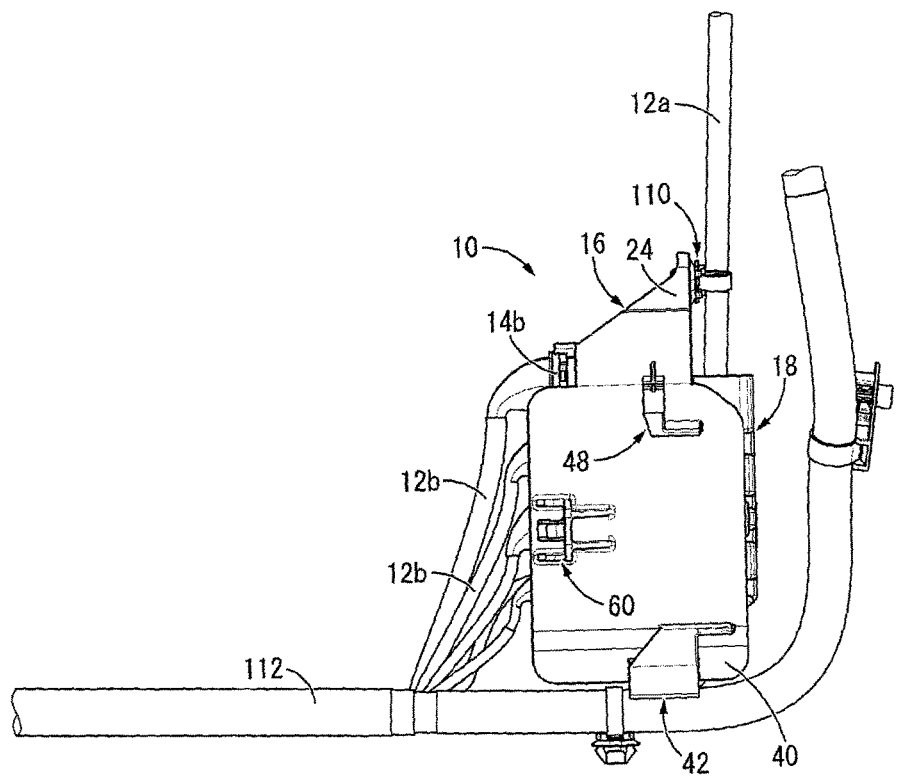
FIG. 2 is a rear view of the connector holder shown in FIG. 1.
Figure 3:
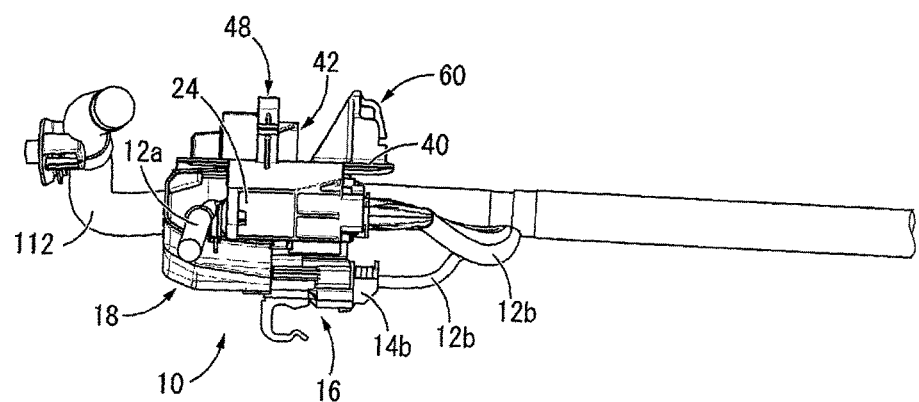
FIG. 3 is a plan view of the connector holder shown in FIG. 1.
Figure 4:
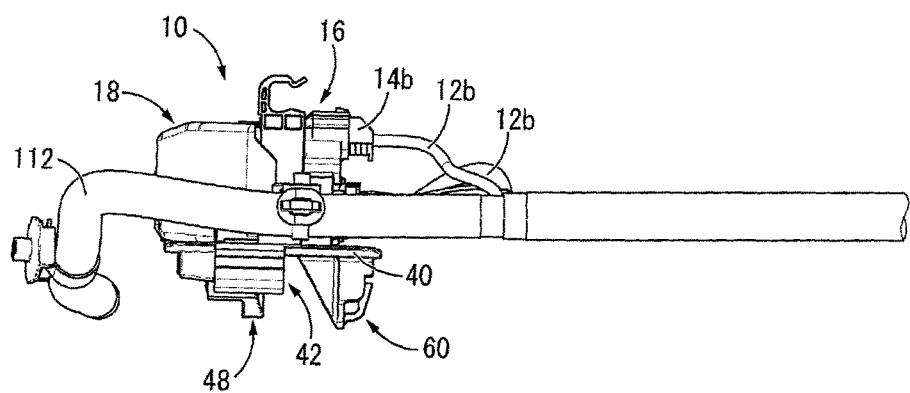
FIG. 4 is a bottom view of the connector holder shown in FIG. 1.
Figure 5:
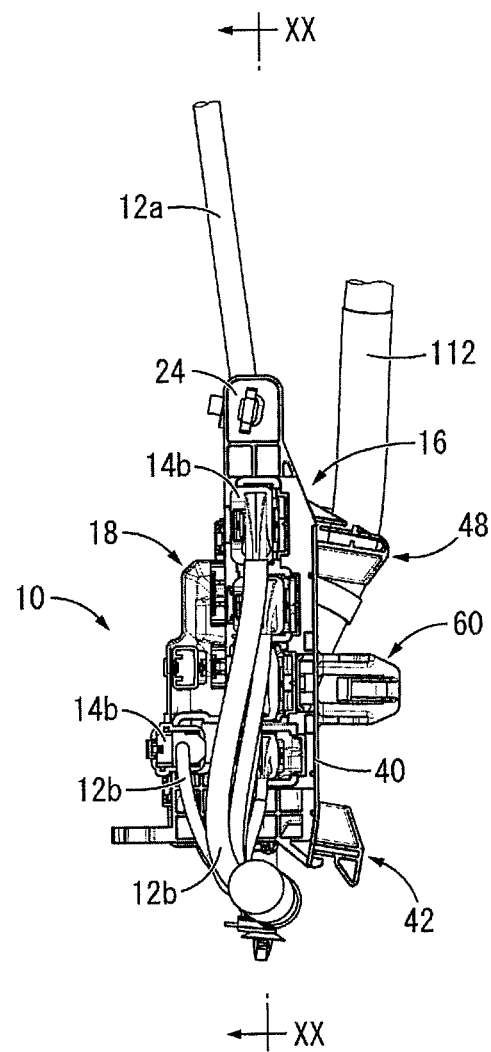
FIG. 5 is a right side view of the connector holder shown in FIG. 1.
Figure 6:
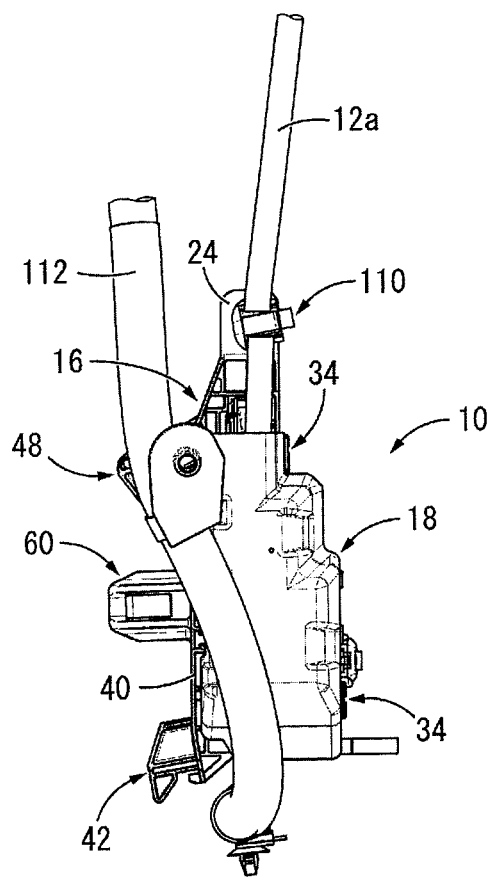
FIG. 6 is a left side view of the connector holder shown in FIG. 1.
Figure 7:
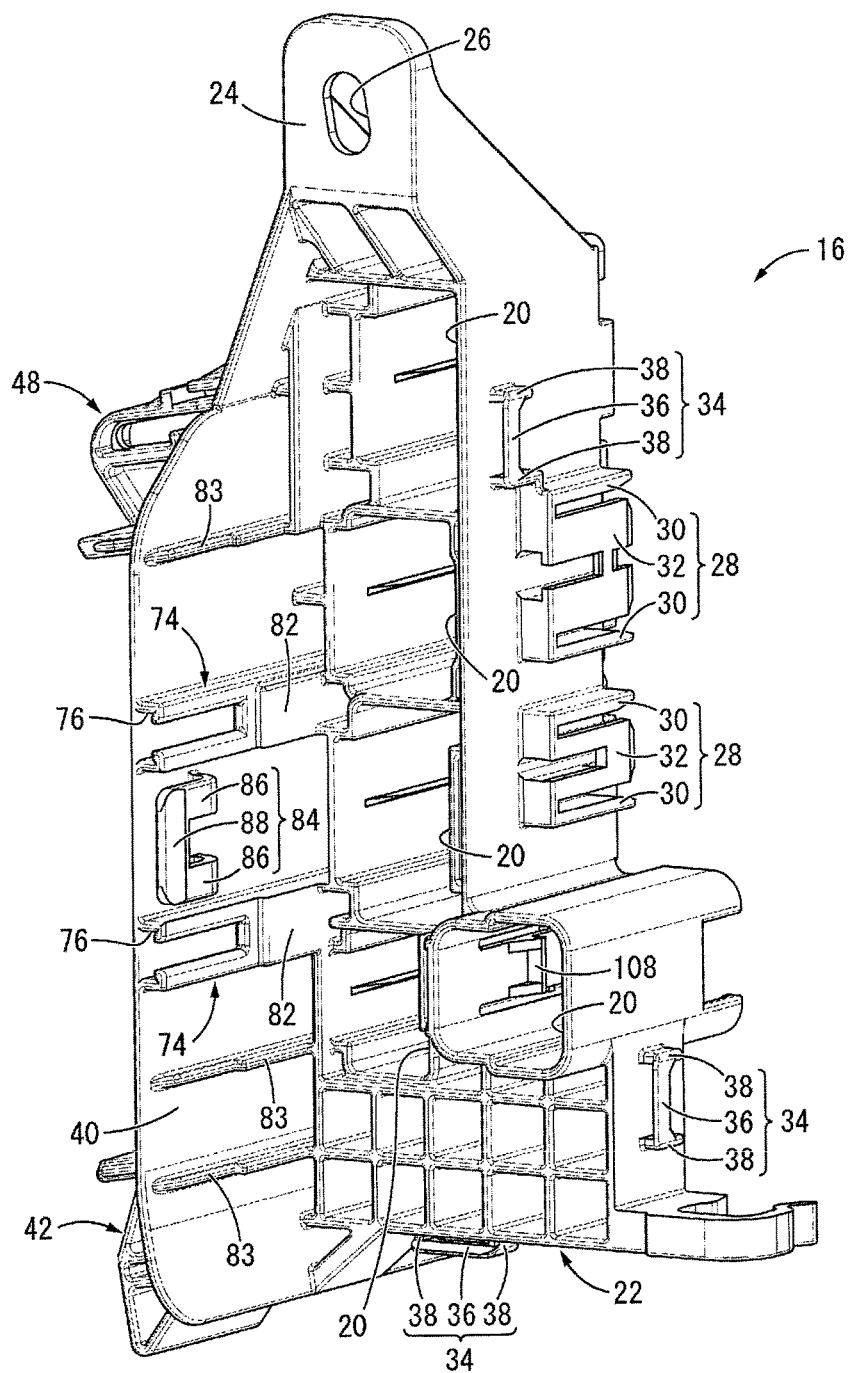
FIG. 7 is an enlarged perspective view of a holder main body that constitutes the connector holder shown in FIG. 1.
Figure 8:
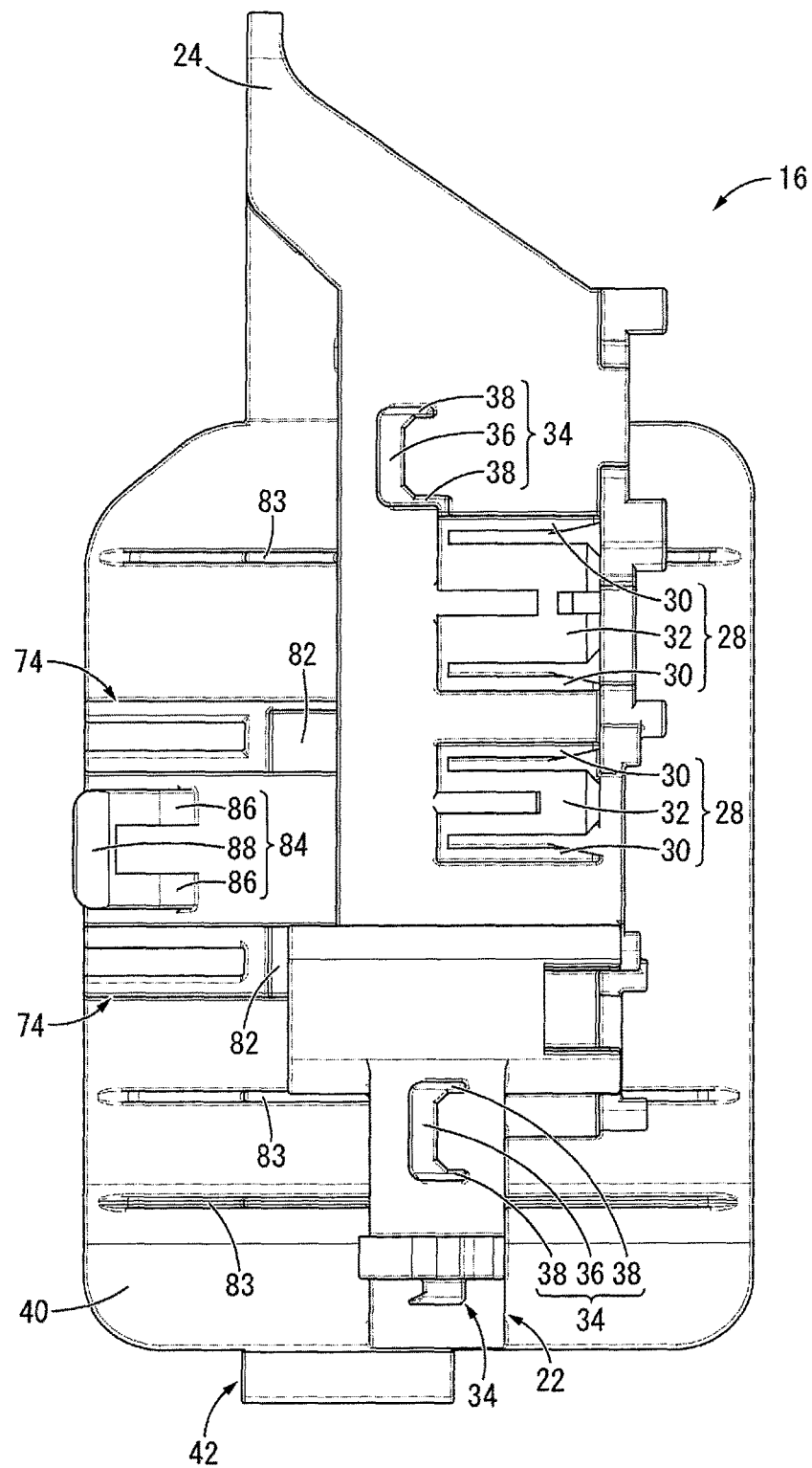
FIG. 8 is an elevation view of the holder main body shown in FIG. 7.
Figure 9:
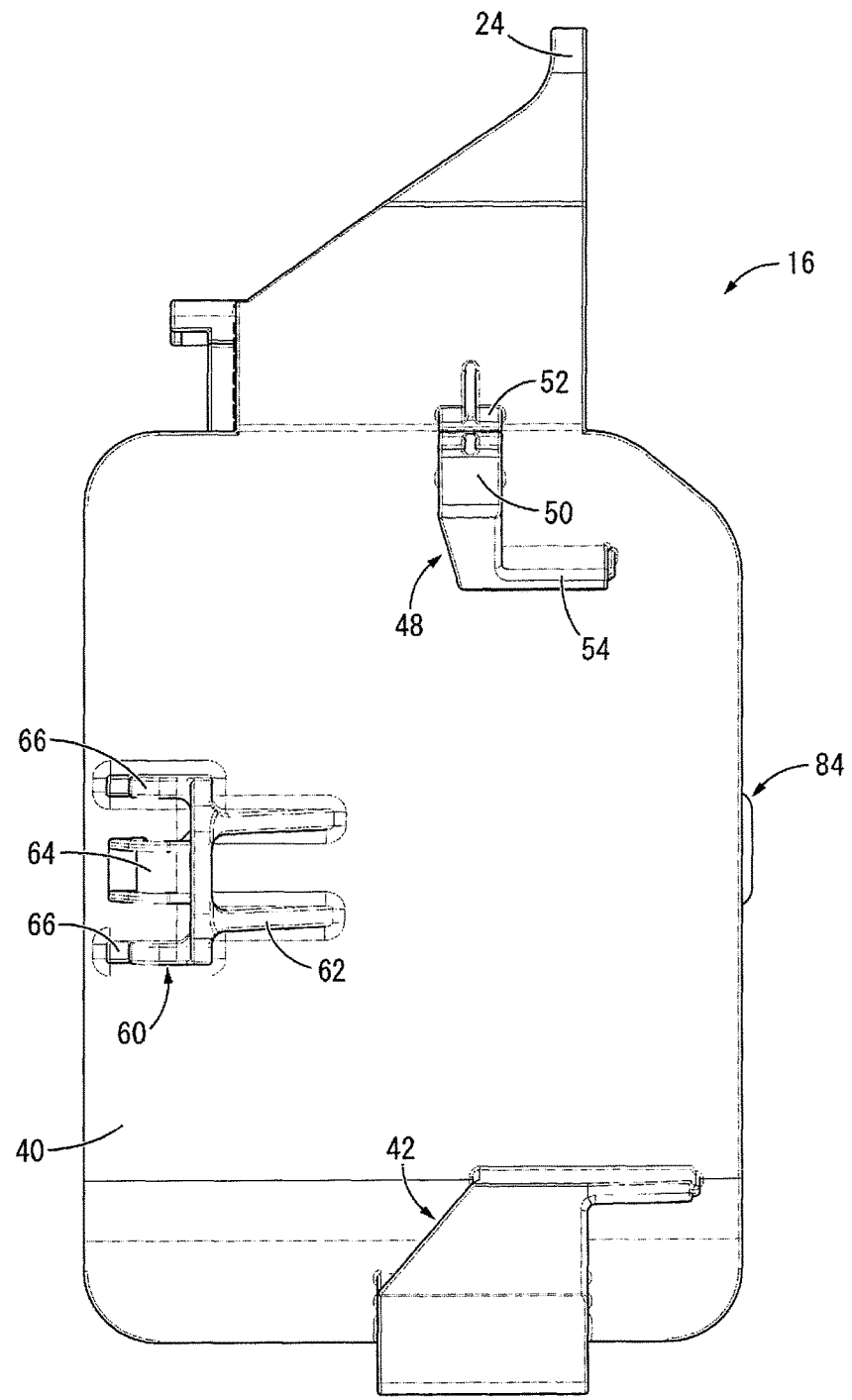
FIG. 9 is a rear view of the holder main body shown in FIG. 7.
Figure 10:
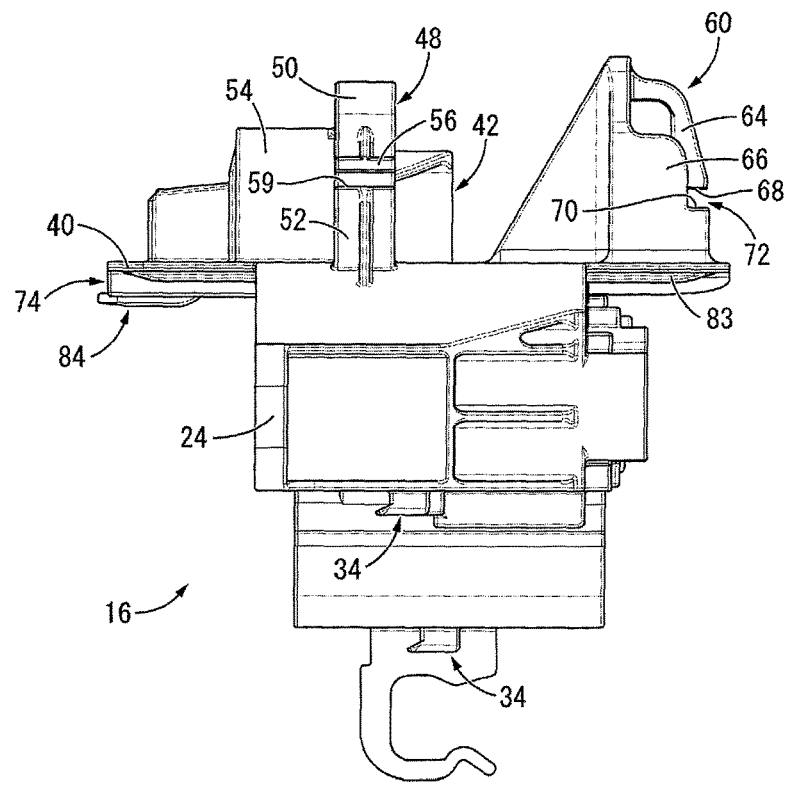
FIG. 10 is a plan view of the holder main body shown in FIG. 7.
Figure 11:
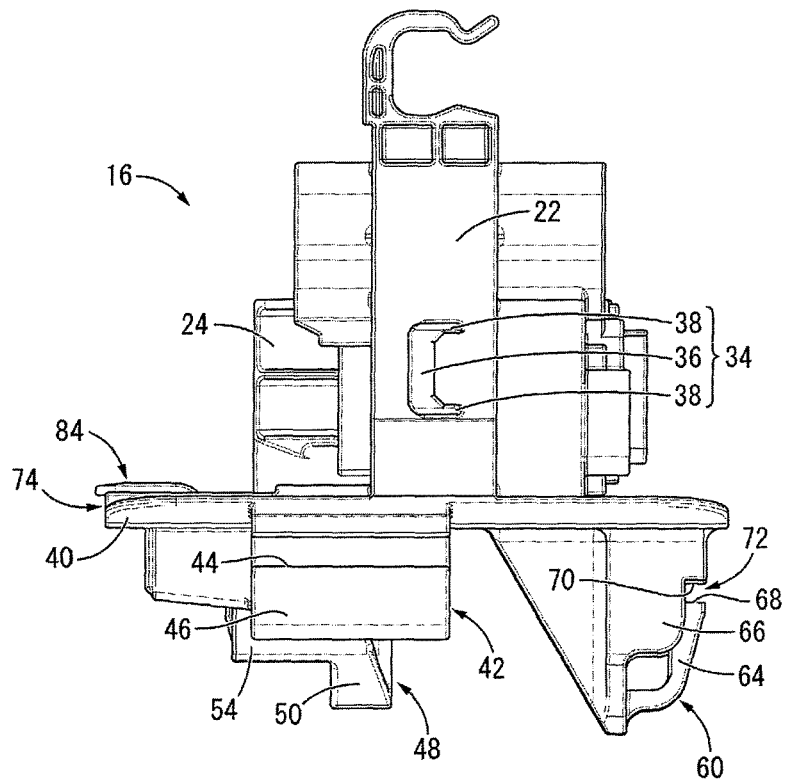
FIG. 11 is a bottom view of the holder main body shown in FIG. 7.

Furthermore, on the right surface of the covering lid wall portion 40, an additional lock fitting portion 60 is provided so as to protrude from the rear end edge portion. The additional lock fitting portion 60 has a structure in which a second elastic deflection piece 64 whose one end portion is supported by a second connecting portion 62 protruding from the covering lid wall portion 40 is provided between a pair of second fixed supporting pieces 66 that are integrally formed with the second connecting portion 62. Also, as shown in FIG. 10, a step 68 is formed at the distal end portion of the second elastic deflection piece 64, and steps 70 are respectively formed at the left and right intermediate portion of the pair of second fixed supporting pieces 66. A second fitting region 72 substantially corresponding to the thickness of the vehicle body panel 114 in the vertical direction to be described later is formed by the step 68 and the steps 70. Note that, similar to the first elastic deflection piece 50 of the lock fitting portion 48, in the second elastic deflection piece 64 of the additional lock fitting portion 60, elastic deflection deformation in the thickness direction (front-back direction) is allowed.

Also, on the surface (left surface) of the covering lid wall portion 40 on the connector accommodation portion 20 side, a pair of guide portions 74 that are arranged vertically in parallel and extend in the front-back direction are formed at the front end portion of the covering lid wall portion 40 protruding from the holder main body 16. Each guide portion 74 has a structure in which locking pieces respectively protruding up and down and inward (inward in the opposing direction of a pair of ribs arranged in parallel) are integrally formed at each of the projecting distal ends of the pair of ribs that are arranged vertically in parallel and extend in the front-back direction, and linearly extend upward and downward in a substantially L-shaped cross section. In this manner, a fitting recessed portion 76 that is surrounded by the ribs and the locking pieces is formed in each guide portion 74.

Furthermore, on an extension of each guide portion 74 toward the holder main body 16, a quadrangular prismatic or tubular reinforcing protrusion portion 82 is formed integrally with the covering lid wall portion 40. The deformation rigidity of the covering lid wall portion 40 is enhanced by the reinforcing protrusion portion 82, and, for example, the shape stability of the guide portions 74 is also improved. Note that multiple reinforcing ribs 83 extending in the front-back direction are formed on the left surface of the covering lid wall portion 40, and the deformation rigidity of the covering lid wall portion 40 is enhanced by the reinforcing ribs 83.

Furthermore, an additional locked portion 84 is provided on the left surface of the covering lid wall portion 40. The additional locked portion 84 is provided between the upper and lower portions of a pair of guide portions 74 at the protruding distal end portion of the covering lid wall portion 40, and includes a pair of upper and lower second supporting portions 86 that protrude from the covering lid wall portion 40 and extend forward in a direction substantially parallel to the covering lid wall portion 40 and a second engaged portion 88 that connects the distal end portions of the second supporting portions 86 to each other vertically.

The cover member 18 is attached to the holder main body 16 that has such a structure. As shown in FIGS. 14 to 17, the cover member 18 is a substantially recessed member that is made of a thin synthetic resin material and is open rearward as a whole. In this embodiment, a wire lead-out portion 90 opens upward. Also, multiple lock portions 92 are formed at rearward opening end portions of the cover member 18. Each lock portion 92 is arranged at a position corresponding to the locked portion 34 of the holder main body 16, and protrudes rearward. A first engaging portion 94 protruding to the outer peripheral side is formed at the protruding distal end portion of each lock portion 92.

In addition, a pair of fitting portions 96 are provided on the right outer surface of the cover member 18. Each fitting portion 96 protrudes from the outer surface of the cover member 18 and linearly extends in the front-back direction. In addition, the protruding distal end portion of each fitting portion 96 is wider in the vertical direction than the base end portion thereof and protrudes upward and downward. Also, the fitting portions 96 have a T-shaped cross section.

Furthermore, an additional lock portion 102 is provided between the upper and lower portions of the pair of fitting portions 96 on the peripheral wall of the cover member 18. The additional lock portion 102 is provided at the front end portion of the right side surface of the cover member 18 that is overlapped with the covering lid wall portion 40, and includes a second engaging portion 104 protruding from the right outer surface of the cover member 18. The second engaging portion 104 gradually narrows in the front-back direction toward the protruding distal end side, and the lower surface and the upper surface of the second engaging portion 104 are inclined upward toward the protruding distal end side.

Figure 18:
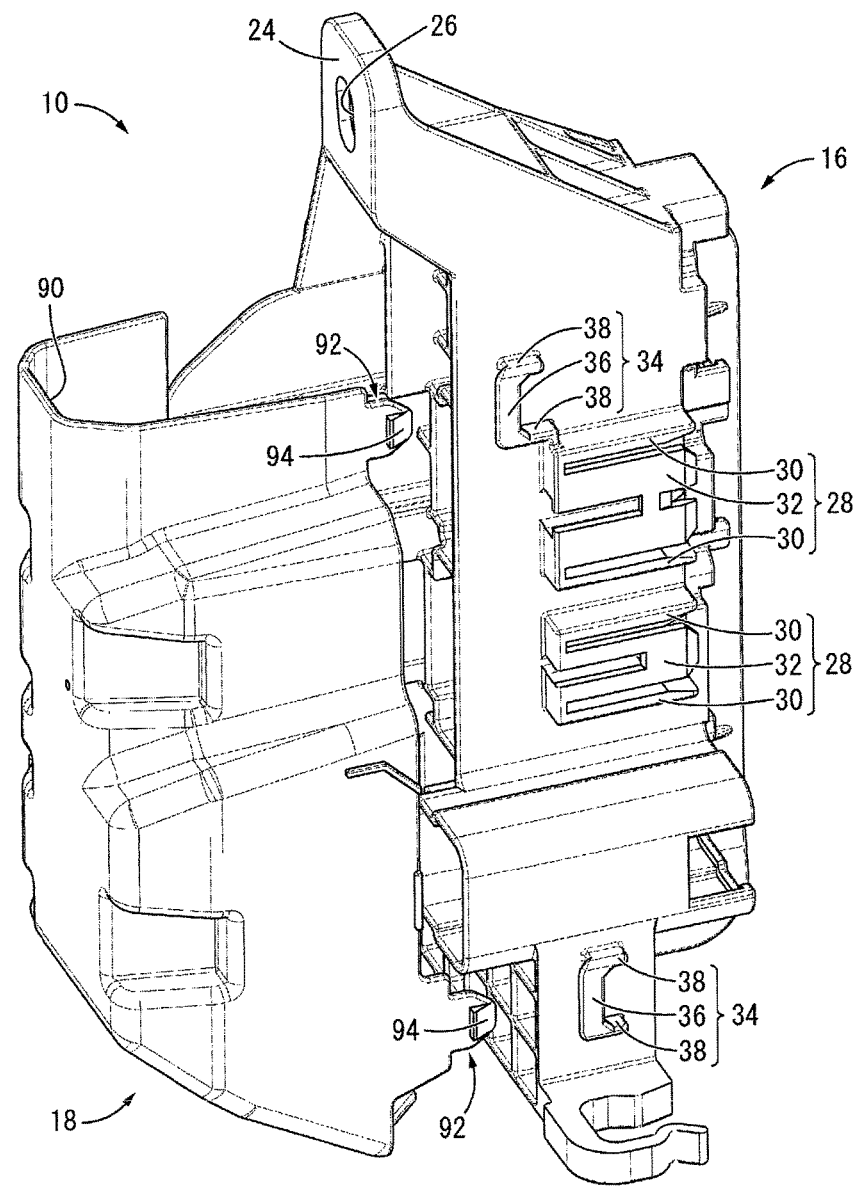
FIG. 18 is a perspective view showing an attachment process of the holder main body shown in FIG. 7 and the cover member shown in FIG. 14.
Figure 19:
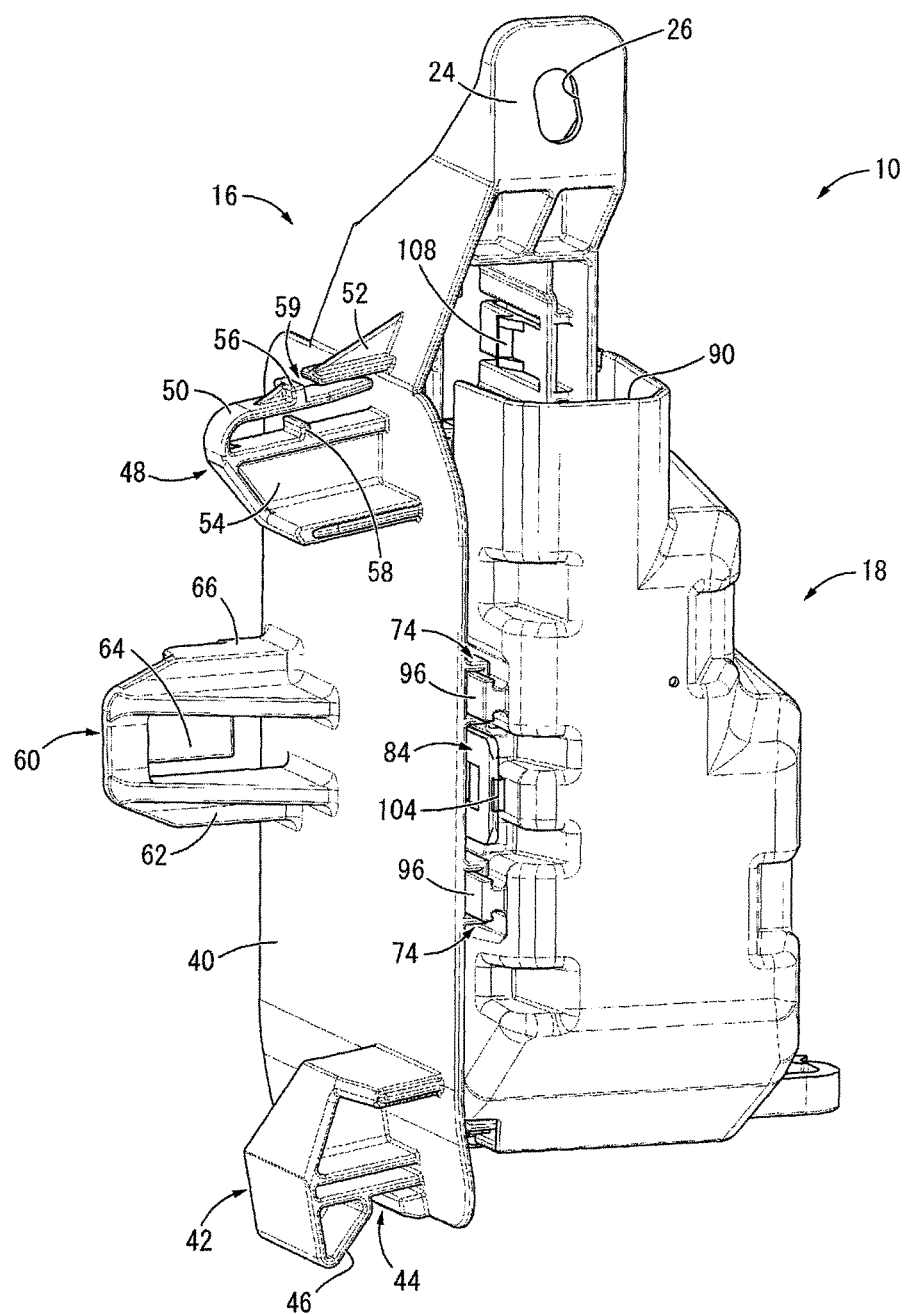
FIG. 19 is a perspective view showing the attachment process of the holder main body and the cover member shown in FIG. 18 at another angle.

As shown in FIGS. 18 and 19, the cover member 18 is attached so as to cover the front side of the holder main body 16. That is, by bringing the cover member 18 closer to the holder main body 16 from the front side, first, the pair of fitting portions 96 of the cover member 18 are inserted into the fitting recessed portions 76 of the pair of guide portions 74 of the holder main body 16 from the front side. Then, with the fitting of the pair of fitting portions 96 and the pair of guide portions 74, the cover member 18 is guided in the attachment direction (front-back direction) with respect to the holder main body 16 in a state where the cover member 18 is positioned at a correct position with respect to the holder main body 16. In particular, as a result of the fitting portions 96 being engaged with the guide portions 74, the holder main body 16 and the cover member 18 are provisionally connected, and it is possible to easily perform locking through the lock fitting to be described later.

Also, by bringing the cover member 18 even closer to the holder main body 16 from the front side while the pair of fitting portions 96 are fitted into the pair of guide portions 74, the first engaging portions 94 of the lock portions 92 of the cover member 18 are engaged with the first engaged portions 36 of the locked portions 34 of the holder main body 16, and the second engaging portion 104 of the additional lock portion 102 of the cover member 18 is engaged with the second engaged portion 88 of the additional locked portion 84 of the holder main body 16. In this manner, the cover member 18 is fixed to the holder main body 16, and the front side of the holder main body 16 is covered by the cover member 18.

As mentioned above, not only the lock portions 92 provided at the opening portion of the cover member 18 are fixed to and locked to the locked portions 34 of the holder main body 16, but also the additional lock portion 102 provided on the peripheral wall of the cover member 18 is fixed to and locked to the additional locked portion 84 provided on the covering lid wall portion 40 of the holder main body 16. Accordingly, the cover member 18 is further stably attached to the holder main body 16, and the thin cover member 18 is effectively reinforced by the holder main body 16. Furthermore, because the fitting position between the lock portions 92 and the locked portions 34 and the fitting portion between the additional lock portion 102 and the additional locked portion 84 are separated in the height direction (front-back direction) of the holder main body 16, the holder main body 16 and the cover member 18 are fixed at multiple places with different positions in the front-back direction, and the holder main body 16 and the cover member 18 are more stably and firmly fixed.

Also, in the connector holder 10 constituted by combining the holder main body 16 and the cover member 18, because the cover member 18 has a recessed shape, a wire accommodation space 106 is formed between the front wall portion of the cover member 18 and the holder main body 16. Then, as shown in FIGS. 1 to 6 and 20, the first connectors 14a that are held by the connector accommodation portions 20 of the holder main body 16 and the end portions of the first wire harnesses 12a that are led out from the respective first connectors 14a are accommodated in the wire accommodation space 106. Note that each first connector 14a is held by the connector accommodation portion 20 in a state where unintentional disengagement is prevented by connector lock portions 108 provided on the inner peripheral surface of the connector accommodation portion 20.

Also, the first connectors 14a attached to the connector holding portions 28 of the holder main body 16 are partially or entirely covered by the cover member 18 so as to be protected from, for example, interference from other members. Note that each wire harness 12a connected to a first connector 14a attached to a connector holding portion 28 is also to be guided to the wire accommodation space 106 through the opening of the cover member 18.

The multiple first wire harnesses 12a extending from the first connectors 14a and accommodated in the wire accommodation space 106 are lead out to the outside through the wire lead-out portion 90 that is open at the top portion of the cover member 18. In this embodiment, multiple first wire harnesses 12a extending from the wire lead-out portion 90 are bundled using a band-like binding member 110 attached to the wire fastening portion 24 of the holder main body 16 and are guided to the outside. On the other hand, the second wire harnesses 12b extending from the respective second connectors 14b connected to the respective first connectors 14a are arranged so as to extend to the opposite side (rearward) from the cover member 18 and merge into a main wire 112 bundled by a corrugated tube or the like.

Figure 21:
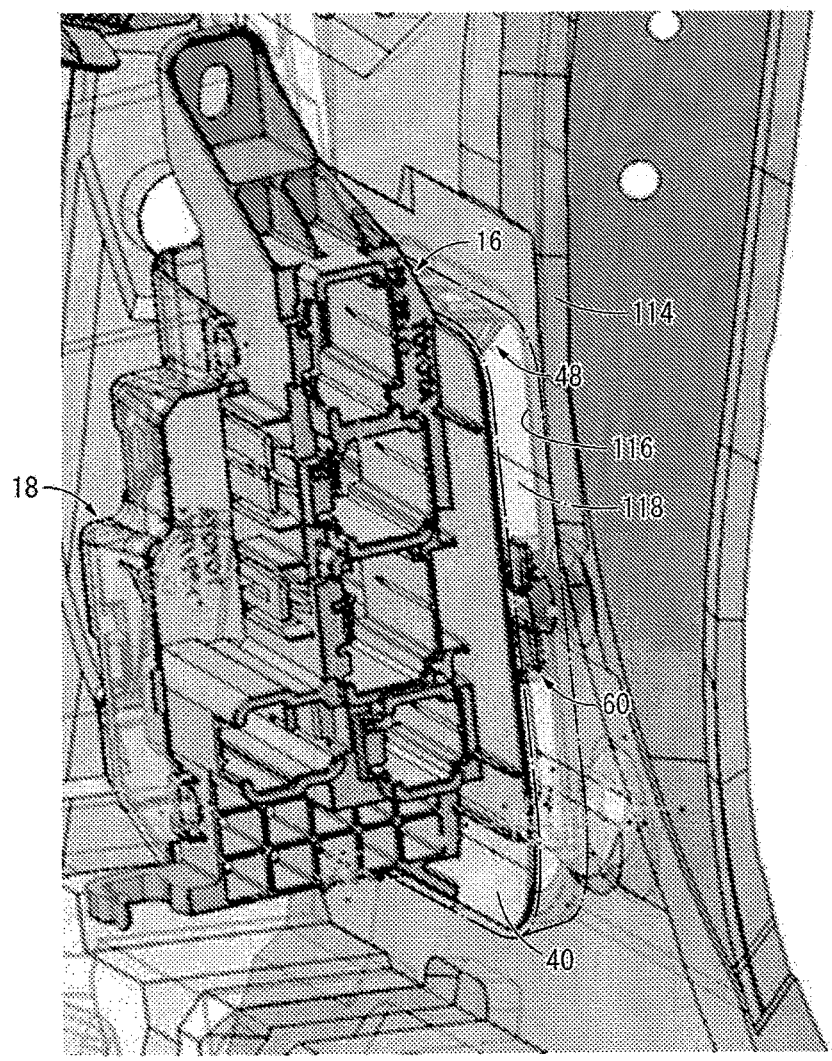
FIG. 21 is a perspective view showing a state in which the connector holder of FIG. 1 is attached to a vehicle body panel.

As shown in FIG. 21, multiple first and second connectors 14a and 14b and the connector holder 10 that holds the first and second wire harnesses 12a and 12b are attached to the vehicle body panel 114 of an automobile, for example. The installation location of the connector holder 10 in an automobile is not particularly limited. For example, the connector holder 10 can be installed in a cowl side trim of an automobile. Specifically, a through hole 116 is formed in the vehicle body panel 114, and the covering lid wall portion 40 of the holder main body 16 is arranged to face the through hole 116. The hook recessed portion 42, the lock fitting portion 48, and the additional lock fitting portion 60 provided in the covering lid wall portion 40 are fitted into the through hole 116 of the vehicle body panel 114. Note that, in FIG. 21, for the sake of clarity, the illustration of first and second connectors 14a and 14b and the first and second wire harnesses 12a and 12b is omitted.

That is, the hook recessed portion 42 provided at the lower end portion of the covering lid wall portion 40 is inserted into the lower peripheral edge portion that is a first peripheral edge portion of the through hole 116 in a state where the covering lid wall portion 40 is inclined so as to be distanced from the vehicle body panel 114 in the upward direction, and the lower peripheral edge portion of the through hole 116 in the vehicle body panel 114 is brought into contact with the guide surface 46 of the hook recessed portion 42. Then, by rotationally moving the connector holder 10 around the contact portion between the hook recessed portion 42 and the lower peripheral edge portion of the through hole 116 so that the upper portion of the covering lid wall portion 40 approaches the vehicle body panel 114, the lower peripheral edge portion of the through hole 116 in the vehicle body panel 114 is fitted into the engagement groove portion 44 of the hook recessed portion 42 and locked. Furthermore, as a result of the upper peripheral edge portion that is a second peripheral edge portion of the through hole 116 in the vehicle body panel 114 being pressed against the first elastic deflection piece 50 of the lock fitting portion 48 provided at the upper end portion of the covering lid wall portion 40 and elastically deforming the first elastic deflection piece 50 downward, the upper peripheral edge portion of the through hole 116 in the vehicle body panel 114 is fitted into the first fitting region 59 of the lock fitting portion 48 and locked. In addition, as a result of the rear peripheral edge portion that is a third peripheral edge portion of the through hole 116 being pressed against the second elastic deflection piece 64 of the additional lock fitting portion 60 provided at the rear edge portion of the covering lid wall portion 40 and elastically deforming the second elastic deflection piece 64 forward, the rear peripheral edge portion of the through hole 116 in the vehicle body panel 114 is fitted into the second fitting region 72 of the additional lock fitting portion 60 and locked.

As a result, the opening peripheral edge portion of the through hole 116 in the vehicle body panel 114 is fitted into and locked to the hook recessed portion 42, the lock fitting portion 48, and the additional lock fitting portion 60 of the connector holder 10, and the connector holder 10 is attached to the vehicle body panel 114.

The covering lid wall portion 40 of the connector holder 10 is larger than the through hole 116 of the vehicle body panel 114 as viewed in the left and right direction, and the through hole 116 is covered by the covering lid wall portion 40 in a state where the connector holder 10 is attached to the vehicle body. Also, in this embodiment, a soundproof member 118 for preventing a reduction in quietness due to the through hole 116 is arranged between the vehicle body panel 114 and the covering lid wall portion 40. Although the soundproof member 118 is not particularly limited, it is preferable that it has sound absorbing properties with which noise entering the vehicle interior can be reduced. For example, the soundproof member 118 may be formed of a porous material such as a piece of plate-shaped urethane foam. Also, the soundproof member 118 is larger than the through hole 116 as viewed in the left and right direction, and is arranged so as to cover the entire through hole 116. Furthermore, the soundproof member 118 may be fixed to the covering lid wall portion 40 or the vehicle body panel 114. However, in this embodiment, as a result of the soundproof member 118 being pressed toward the vehicle body panel 114 side by the covering lid wall portion 40, the peripheral edge portion of the soundproof member 118 is sandwiched between the covering lid wall portion 40 and the opening peripheral edge portion of the through hole 116 in the vehicle body panel 114 in a non-fixed manner, and the covering lid wall portion 40 has a soundproof member supporting function. Note that, in FIG. 21, because the soundproof member 118 is shown as semitransparent so as to make it easy to see the through hole 116 or the like, the soundproof member 118 is shown with a dashed line in order to make it easy to recognize the soundproof member 118. Also, not clearly shown in the drawing, a hole and a notch through which the hook recessed portion 42, the lock fitting portion 48, and the additional lock fitting portion 60 are passed are formed in the soundproof member 118.

With the connector holder 10 having a structure according to this embodiment, because the covering lid wall portion 40 of the holder main body 16 spreads in a size capable of covering the through hole 116 of the vehicle body panel 114, the hook recessed portion 42, the lock fitting portion 48, and the additional lock fitting portion 60 provided on the outer peripheral portion of the covering lid wall portion 40 can be fitted into and locked to three sides of the opening peripheral edge portion of the through hole 116 in the vehicle body panel 114. In this manner, it is possible to firmly fix the connector holder 10 to the vehicle body panel 114 with a simple operation of merely fitting the hook recessed portion 42, the lock fitting portion 48, and the additional lock fitting portion 60 into the through hole 116 of the vehicle body panel 114. In particular, in this embodiment, because the additional lock fitting portion 60 that is fitted to the rear edge portion of the through hole 116 is provided in addition to the hook recessed portion 42 and the lock fitting portion 48 that are respectively fitted to the upper edge portion and the lower edge portion of the through hole 116, the connector holder 10 is more firmly attached to the vehicle body panel 114.

In addition, the hook recessed portion 42, the lock fitting portion 48, and the additional lock fitting portion 60 need only be inserted through the through hole 116. Accordingly, the holder main body 16 and the cover member 18 do not protrude to the outside of the vehicle body panel 114 through the through hole 116, and the connector holder 10 has little influence on the space outside of the vehicle body panel 114. Furthermore, because a bolt fastening structure such as a bracket is not provided, the protruding dimension of the connector holder 10 to the inside of the vehicle body panel 114 can also be suppressed, and the connector holder 10 can be arranged in the space inward of the vehicle body panel 114 in a space efficient manner.

Also, because the soundproof member 118 provided between the covering lid wall portion 40 and the vehicle body panel 114 is pressed toward the vehicle body panel 114 side and supported by the covering lid wall portion 40, the soundproof member 118 can be easily attached by attaching the connector holder 10 that includes the covering lid wall portion 40 to the vehicle body panel 114. In this embodiment, because the soundproof member 118 is formed as a plate-shaped member that is larger than the through hole 116 of the vehicle body panel 114 as viewed in the left and right direction. Accordingly, the entire through hole 116 is covered by the soundproof member 118 and the outer peripheral portion of the soundproof member 118 is sandwiched and held between the covering lid wall portion 40 and the vehicle body panel 114. In this manner, the soundproof member 118 is stably held at a predetermined position, and the noise transmitted to the vehicle interior through the through hole 116 can be effectively reduced by the soundproof member 118.

Although the embodiment of the present invention has been described in detail above, the present invention is not limited by the specific description thereof. For example, in the above embodiment, although the covering lid wall portion 40 of the holder main body 16 protrudes to both sides in the height direction with respect to the other side surfaces of the peripheral wall of the holder main body 16, the covering lid wall portion 40 of the holder main body 16 may have a structure protruding only to one side.

In the attachment structure of the covering lid wall portion 40 to the vehicle body panel 114, the additional lock fitting portion 60 is not indispensable and can be omitted. Furthermore, for example, it is possible to provide a further additional lock fitting portion on the front peripheral edge portion of the covering lid wall portion 40. Note that the additional lock fitting portion 60 may be provided on the front peripheral edge portion of the covering lid wall portion 40.

The specific number and arrangement of the connector accommodation portions 20 and the connector holding portions 28 provided in the connector holder 10 are merely examples, and can be appropriately changed.

In the above embodiment, the connector holder 10 is shown as an example of a vehicle-mounted component, but the vehicle-mounted component is not limited thereto. For example, the present invention is also suitably applicable to an electrical junction box such as a junction box and a fuse box that have an electric circuit therein.

LIST OF REFERENCE NUMERALS

10 Connector holder (vehicle-mounted component)
16 Holder main body (box main body)
18 Cover member
34 Locked portion
40 Covering lid wall portion
42 Hook recessed portion
48 Lock fitting portion
50 First elastic deflection piece (elastic deflection piece of lock fitting portion)
60 Additional lock fitting portion
64 Second elastic deflection piece (elastic deflection piece of additional lock fitting portion)
74 Guide portion
84 Additional locked portion
92 Lock portion
96 Fitting portion
102 Additional lock portion

114 Vehicle body panel
116 Through hole
118 Soundproof member

The invention claimed is:

1. A vehicle-mounted component comprising: a box main body and a cover member covering an opening portion of the box main body and is configured to be fixed to a through hole provided in a vehicle body panel, wherein a first side surface of a peripheral wall of the box main body is arranged opposite to the through hole, and includes a covering lid wall portion that protrudes more in a height direction of the peripheral wall than other side surfaces of the peripheral wall of the box main body and extends in a manner covering the through hole, a hook recessed portion that is inserted into a first peripheral edge portion of the through hole and a lock fitting portion that is fitted to and locked to a second peripheral edge portion opposite to the first peripheral edge portion of the through hole via an elastic deflection piece are provided on a surface of the covering lid wall portion on the through hole side, and the covering lid wall portion is fixed to the vehicle body panel via the hook recessed portion and the lock fitting portion of the covering lid wall portion, and a guide portion into which a fitting portion provided on an outer surface of the cover member is fitted is provided on a surface of the covering lid wall portion on the box main body side so as to be located on a protruding end portion side with respect to the box main body, and a lock portion provided in an opening end portion of the cover member is positioned with respect to a locked portion provided on the other side surface of the peripheral wall of the box main body by fitting the fitting portion of the cover member into the guide portion of the covering lid wall portion.

2. The vehicle-mounted component according to claim 1, wherein
an additional lock portion is provided at an upper end portion of an outer surface of the cover member that is overlapped with the covering lid wall portion, and an additional locked portion into which the additional lock portion is fitted is provided at a protruding distal end portion of the covering lid wall portion.

3. The vehicle-mounted component according to claim 1, wherein
an additional lock fitting portion that is fitted to and locked to a third peripheral edge portion extending orthogonally to the first peripheral edge portion and the second peripheral edge portion of the through hole via an elastic deflection piece is provided on the surface of the covering lid wall portion on the through hole side.

4. The vehicle-mounted component according to claim 1, wherein
a soundproof member is arranged between the covering lid wall portion and the vehicle body panel, and the covering lid wall portion supports the soundproof member by pressing the soundproof member to the vehicle body panel side.

* * * * *